United States Patent
Ball et al.

[11] Patent Number: 5,950,020
[45] Date of Patent: Sep. 7, 1999

[54] FOLDING PHOTOGRAPHIC METHOD AND APPARATUS

[75] Inventors: Alan D. Ball, Arlington; Peter P. Clark, Boxborough; John P. Kirby, West Peabody; Paul F. Neely, Quincy; Jason D. Silver, Arlington; George D. Whiteside, Lexington, all of Mass.

[73] Assignee: Polaroid Corporation, Cambridge, Mass.

[21] Appl. No.: 09/008,644

[22] Filed: Jan. 16, 1998

Related U.S. Application Data

[60] Provisional application No. 60/037,649, Jan. 22, 1997.

[51] Int. Cl.$^6$ .......................... G03B 13/34; G03B 17/04; G03B 17/00
[52] U.S. Cl. ..................... 396/73; 396/103; 396/121; 396/348; 396/535; 396/30
[58] Field of Search .................. 396/73, 75, 83, 396/100, 103, 121, 348, 535, 30

[56] References Cited

U.S. PATENT DOCUMENTS

| | | | |
|---|---|---|---|
| 4,199,246 | 4/1980 | Muggli | 396/104 |
| 4,291,965 | 9/1981 | Johnson et al. | 396/103 |
| 4,452,519 | 6/1984 | Fraser et al. | 396/178 |
| 4,650,292 | 3/1987 | Baker et al. | 359/676 |
| 4,655,571 | 4/1987 | Ohmura et al. | 396/72 |
| 4,668,062 | 5/1987 | Lippert | 396/33 |
| 4,685,791 | 8/1987 | Falzone et al. | 396/33 |

*Primary Examiner*—D. Rutledge
*Attorney, Agent, or Firm*—Barry Gaiman; Robert J. Decker

[57] ABSTRACT

A multiple focal length folding imaging device includes a first and second housing which are operably joined together for movement relative to one another so that the second housing is movable relative to the first housing between at least a first position and a second position. The first housing is formed to at least partially receive therein the second housing, such that when the second housing is in the first position, the second housing is at least partially received within the first housing. The second housing includes an exiting aperture for allowing exiting of at least one image recordable unit therefrom when in the second position, and when the second housing is in the first position, the exiting aperture is at least partially disposed within the first housing so that the at least one image recordable unit cannot exit from the exiting aperture. Furthermore, the imaging device includes a lens movement mechanism for transferring linear motion to rotational motion so that different lens systems can be readily moved into the optical path of the imaging device.

28 Claims, 16 Drawing Sheets

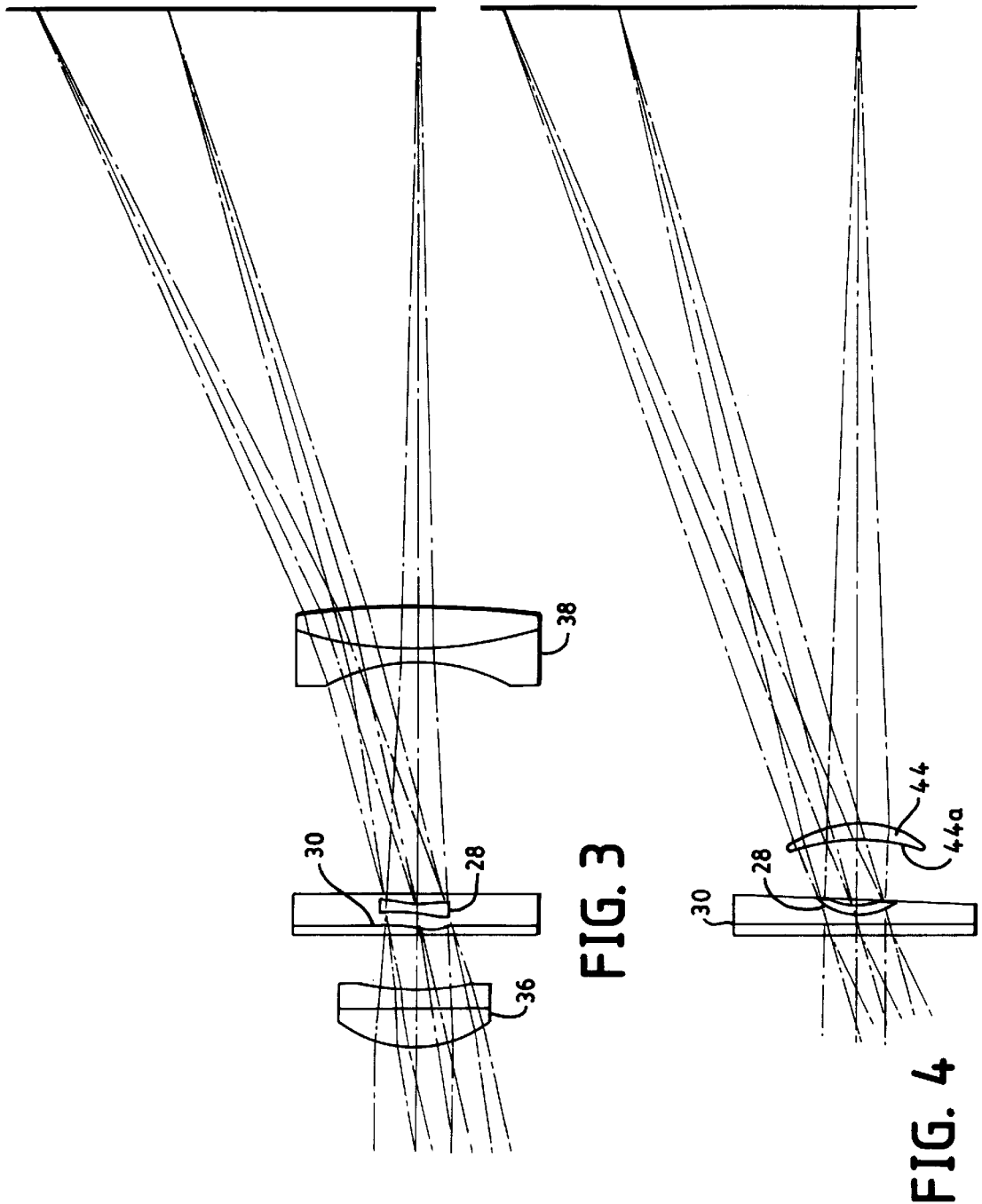

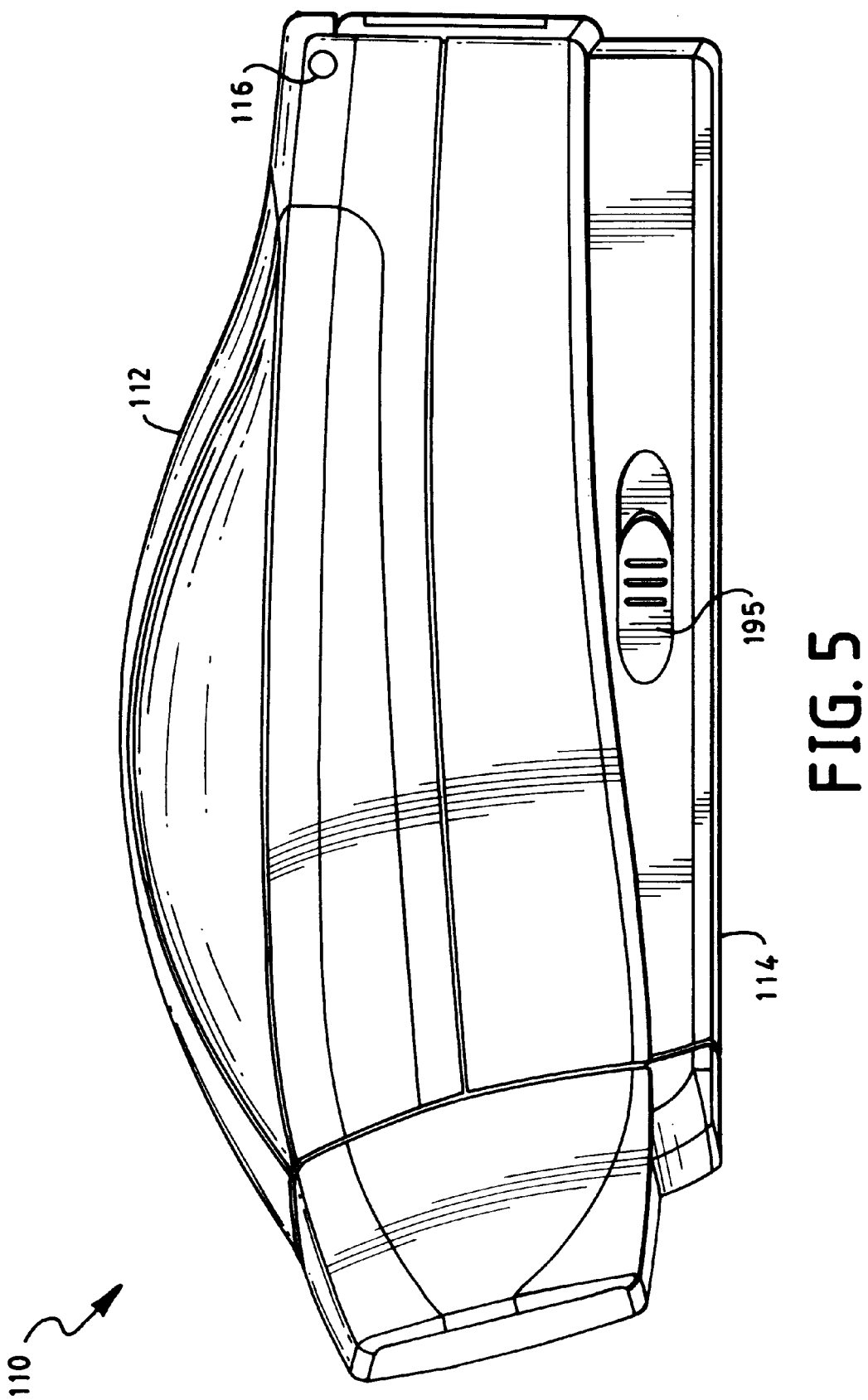

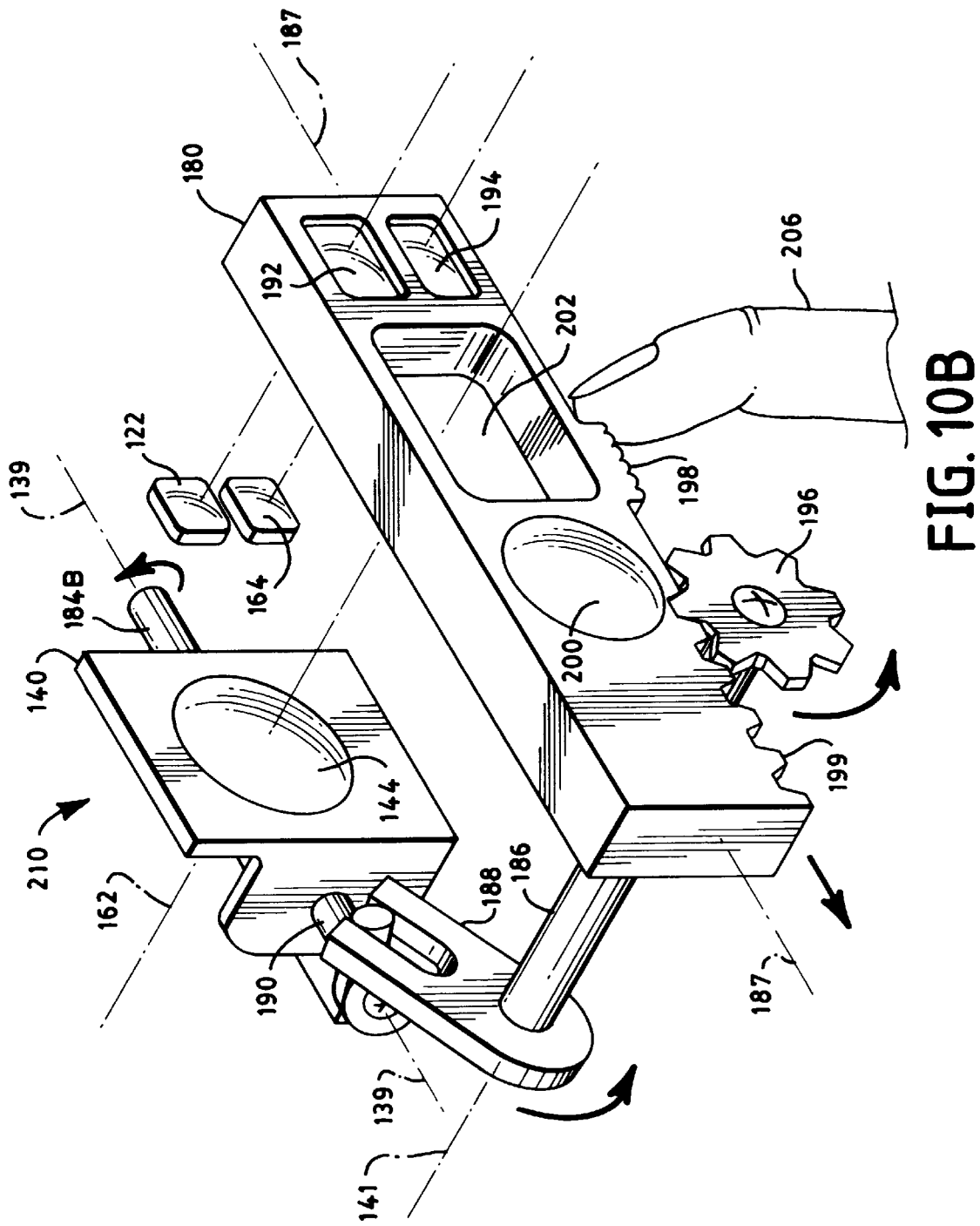

FOLDING PHOTOGRAPHIC METHOD AND APPARATUS

BACKGROUND OF THE INVENTION

This application claims the benefit of U.S. Provisional Patent Application No. 60/037,649 filed Jan. 22,1997.

The present invention relates broadly to imaging apparatus and methods and, in particular, to improved folding cameras, preferably, of the self-developing type having multiple focal lengths.

Folding cameras of the self-developing type are well known in the art. For instance, U.S. Pat. No. 4,452,519 issued Jun. 5, 1984 to Fraser et al. discloses a folding camera having a camera exit slot or egress located on a lower housing of the camera. The exit slot remains visible on the external camera wall whether the camera is in the open or closed position. In contrast, the present invention provides a folding self-developing type of camera which has first and second housings joined together for movement relative to each other such that a film exit slot on the second housing is at least partially disposed within the first housing when the camera is in an inoperable mode.

Cameras with multiple focal length lens systems are also well known in the art of photography. For instance, some cameras are constructed to cooperate with interchangeable lenses having different focal lengths that are externally mounted to the camera body. Accordingly, whenever a user wants to change the focal length, one lens system is removed from the camera and replaced by another having the desired focal length. Other cameras are known in which focal lengths of the optical system are altered internally and automatically to present a correct lens corresponding to a particular subject range (see, for instance, the camera described in U.S. Pat. No. 4,291,965 issued Sep. 29, 1981 to Johnson et al.). It is also desirable to provide cameras with compact telephoto lens arrangements, such as described in U.S. Pat. No. 4,655,571 issued Apr. 7, 1987 to Ohmura et al. Each of the U.S. Pat. Nos. 4,452,519, 4,291,965 and 4,655,571 is incorporated herein by reference in its entirety for background information.

Various apparatus have been devised to move lens systems having different focal lengths in and out of the optical path of an imaging device. For example, the previously cited '965 patent discloses a lens carrier with lens elements mounted thereon for rotational displacement. The lens carrier is rotated by a latch and actuator member. An improved lens movement mechanism for altering the focal length of an imaging apparatus is hereinafter described according to the principles of the present invention.

SUMMARY OF THE INVENTION

According to the present invention, provision is made for an improved method of and apparatus for providing a compact photographic apparatus, preferably of the self-developing type, having multiple focal lengths, each of which can be selected independently and easily.

In one illustrated embodiment provision is made for a camera including a focusing lens means for directing image forming light rays from a scene to a film plane; at least a dual focal length lens means having first and second lens systems; respectively, each of the lens systems being movable into and out of operative optical relationship with the focusing lens means for providing corresponding different focal lengths for the camera.

In another illustrated embodiment one of the lens systems is a telephoto type. In still another embodiment the camera is of the self-developing type.

In yet another embodiment, the camera further comprises means for mounting each of the lens systems for sequential movement into and out of operative optical relationship with the focusing lens means, such that when one of the lens systems is in operative relationship the other is out of operative relationship.

In still another illustrated embodiment, the mounting means includes a single carrier means movable between first and second positions, such that one of the lens systems is in operative optical relationship with the focusing lens means when the carrier is in the first position, and the other of the lens systems is in operative optical relationship with the focusing lens means when the carrier is in the second position.

In yet another embodiment, the mounting means includes a separate carrier means for each of the lens systems, wherein each of the separate carriers is coupled to each other so as to be mutually movable with respect to each other, whereby when one of the respective lens systems is in operative optical relationship with the focusing lens means when the other lens system is out of operative optical relationship.

In another embodiment, provision is made for altering camera functions in response to the lens system selected. In yet another embodiment, provision is made for means for controlling the field of view of the viewfinder so as to make the field of view correspond to the lens system in operative relationship with the focusing lens means of the camera.

In another embodiment, a multiple focal length folding imaging device includes first and second housing means which are operably joined together for movement relative to one another so that the second housing means is movable relative to the first housing means between at least a first position and a second position. The first housing means is formed to at least partially receive therein the second housing means, such that when the second housing means is in the first position, the second housing means is at least partially received within the first housing means. The second housing means includes an exiting means for allowing exiting of at least one image recordable unit therefrom when in the second position, and when the second housing means is in the first position, the exiting means is at least partially disposed within the first housing means so that the image recordable unit cannot exit from the exiting means. Furthermore, the imaging device includes a lens movement mechanism for transferring linear motion to rotational motion so that different lens systems can be readily moved into the optical path of the imaging device.

In yet another embodiment, the camera further comprises motion transfer means for transferring linear motion of a first housing means into circular motion of a second housing means about a second housing means axis so that, in a long focal length position, a long focal length focusing lens means is in line with a first focusing lens means and both photometric means and viewfinder optics means are in line with means for passing light, and in a short focal length position, a short focal length focusing lens means is in line with the means for passing light, photometric correction means is in line with the photometric means and viewfinder optics correction means is in line with the viewfinder optics means.

Among the other objects of the present invention are, therefore, the provision of method and apparatus that provide a compact photographic apparatus having multiple focal lengths including at least a long focal length.

It is another object of the present invention to permit selection of different focal lengths to change relative to an existing focusing lens of the camera.

It is an object of the present invention, to provide a photographic apparatus of the above type that is, preferably, of the self-developing type.

It is a further object of the present invention to provide a photographic apparatus of the above type wherein each focal length can be selected independently and easily.

It is a further object of the present invention to provide a photographic apparatus of the above type wherein operative camera functions can be changed in response to the focal length selected.

It is a further object of the present invention to provide a photographic apparatus of the above type wherein one of the focal lengths is a telephoto type.

It is a further object of the present invention to provide a photographic apparatus of the above last noted type; wherein the telephoto lens system provides a short telephoto ratio, thereby making for a compact optical path.

It is an object of the present invention to provide a photographic apparatus of the above type that provides a compact photographic apparatus of the instant developing type having multiple focal lengths including one having a short telephoto ratio.

It is yet another object of the present invention to provide an improved lens movement mechanism for moving appropriate lenses into and out of the optical path when selecting different focal lengths.

Other objects and advantages of the present invention will become apparent from the following more detailed description thereof when taken in conjunction with the accompanying drawings in which like structure is represented by like reference numerals throughout the several views.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein:

FIG. 3 is a diagram of one of the lens systems usable in the camera of FIG. 1;

FIG. 4 is a diagram of another of the lens systems usable in the camera of FIG. 1;

FIG. 5 is a left exterior view of another preferred embodiment of a camera in an inoperative mode made according to the principles of the invention;

FIG. 10B is an operational drawing of the lens movement mechanism of FIG. 10A in the short focal length position, as shown in the multiple focal length camera of FIG. 9B, according to the principles of the invention;

FIG. 13A illustrates the long focal length position where the first lens is positioned along the optical path of the camera and the second lens is positioned outside the optical path of the viewfinder; and FIG. 13B illustrates the short focal length position where the first lens is positioned outside the optical path of the camera and the second lens is positioned along the optical path of the viewfinder.

DETAILED DESCRIPTION OF THE PREFERRED EMBODIMENTS

Figure 1:
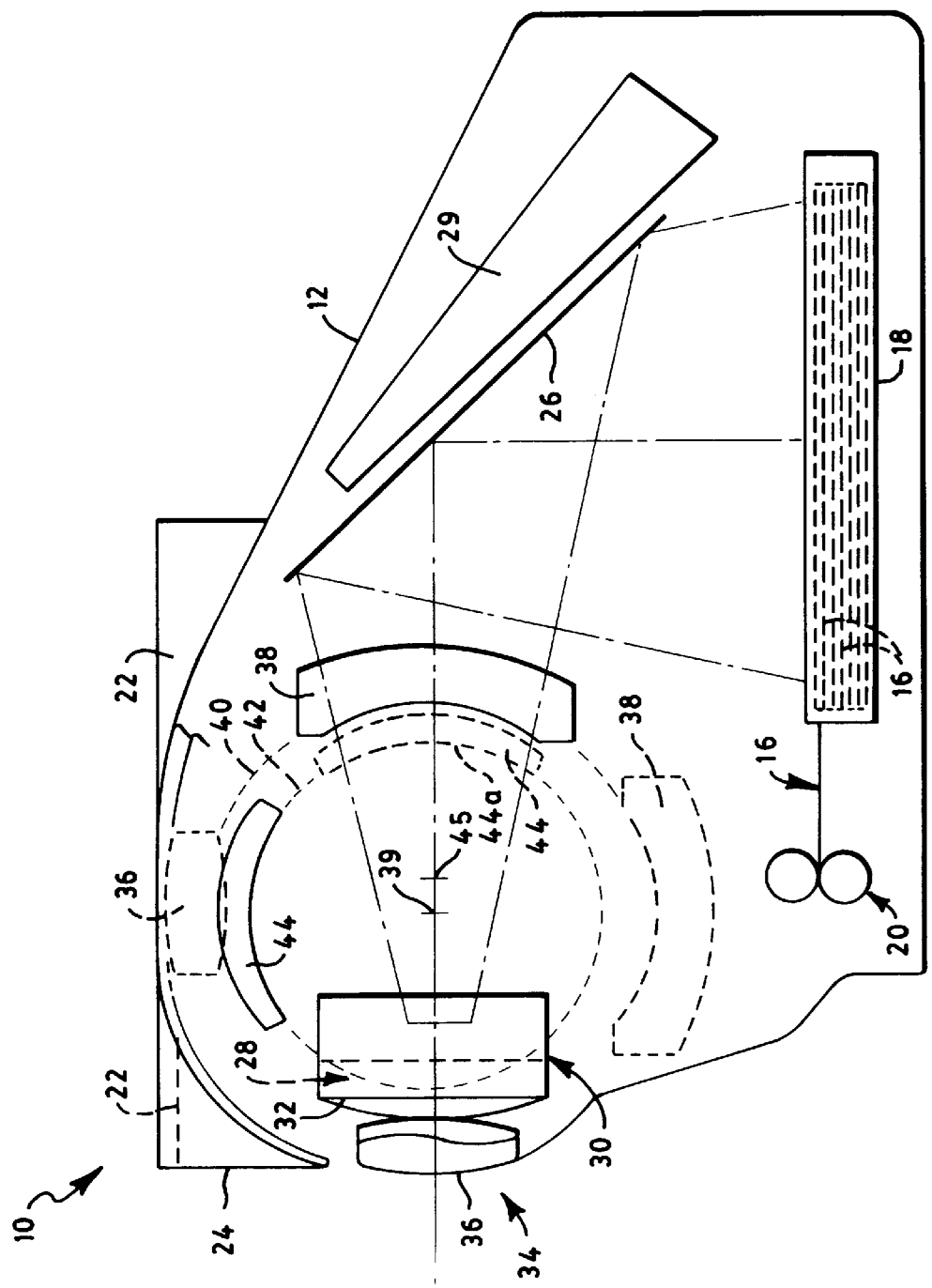
FIG. 1 illustrates a schematic diagram of one preferred embodiment of a camera made according to the principles of the present invention.

FIG. 1 illustrates an improved camera made according to the principles of the present invention. The camera 10 is preferably of the self-developing type and includes a housing assembly 12. The housing assembly 12 defines a light-tight compartment 14 for exposing and developing film units 16 of the self-developing type. The film units are stacked in a film cassette 18 such as described in U.S. Pat. No. 4,685,791; which description is incorporated herein by reference and made a part hereof. The film units in the cassette 18 are sequentially exposed at a focal plane and developed in a known manner such as is described in U.S. Pat. No. 4,668,062; which description is also incorporated herein by reference and made a part hereof. Hence, only those components thereof necessary to understand the following embodiments will be set forth.

The camera 10 provides a film processing system, schematically represented by a pair of spread rollers 20 that are situated in the housing intermediate a cassette film exit slot (not shown) and a film exit slot (not shown). As is well known in this art, the spread rollers 20 when actuated serve to progressively spread the processing fluid located in a rupturable processing pod formed in each film unit. Following an exposure of the topmost film unit in the cassette, the latter is advanced through an exit slot (not shown) in the cassette by a film advancing mechanism, not shown but forming a part of the camera noted above, into a nip of the pair of the spread rollers 20. The spread rollers 20 rupture the pod and spread the processing fluid as they drive film unit from the film exit slot formed in a front wall of the camera housing. The camera includes a lens and shutter package assembly 30.

In addition, the camera 10 includes a rangefinder system (not shown) to determine the distance to the subject to be photographed, a photocell (not shown), a viewfinder system 22 through which the scenes to be photographed maybe framed and a strobe 24 for illuminating the scene to be photographed. Also formed in the camera is a mirror 26 for redirecting the image forming light rays traveling from the scene and a focusing lens system 28 of the lens and shutter package arrangement 30. An electronics module 29 is located behind the mirror 26 and serves to control the operations of the camera 10. In this embodiment, a lens and shutter package arrangement 30 is provided for directing and focusing the image forming scene rays onto the focal plane. A more specific description of the lens and shutter package arrangement 30 used in this embodiment is described in U.S. Pat. No. 4,650,292, issued to Baker et al. and is incorporated herein by reference and made a part hereof. Basically, in this system the shutter blades are located between two elements of the focusing lens system. This embodiment is different however from the standpoint of having a transparent dust protector plate 32 covering the lens and shutter package 30 given the fact that there are provided mechanisms for providing multiple focal lengths.

With continued reference to FIG. 1, there is illustrated a telephoto lens system 34 that cooperates with the existing focusing lens of the lens and shutter package 30. The telephoto lens system 34 of this embodiment includes a net positive lens doublet group 36 and appropriately spaced therefrom is a net negative doublet group 38. It will be seen that this telephoto lens arrangement has the shutter lens package 30 intermediate the positive and negative lens groups 36, 38. The lens groups 36, 38 can be made of a plurality of different and suitable materials and in this embodiment they are made of plastic materials. The telephoto lens system 34 can be have a variety of optical parameters and in this embodiment it can have a effective focal length of about 9 inches or 229 mm., a distortion of about +/−0.04 and a working f-number of about 17.5. In this embodiment, both groups of the telephoto lens system 34 are preferably mounted on a rotatable lens carrier 40 for rotation about the axis 39 between an operative position such as illustrated in FIG. 1 and the dotted line position; whereby they are in a non-operative mode. The carrier 40 can be mounted for rotation manually or by a suitable motor driven system (not shown).

Mounted on a second rotatable or pivotal lens carrier 42 is a relatively shorter focal length positive lens 44 that will provide for a different focal length for the camera 10 when it optically cooperates with the focusing lens of the lens and shutter package 30. Such optical cooperation results when the second lens carrier 42 is in its operative position; such as shown by the dotted lines in FIG. 1. The second lens carrier 42 is rotatable about a second axis 45 between the noted operative position and an inoperative position. When the second carrier is in the inoperative position, the first lens carrier is in its operative position. In this embodiment, the positive lens 44 is a single meniscus made from plastic. The lens 44 can have an effective focal length of about 4.79 inches or about 121.7 mm.; the distortion can be about +/−0.04 and a working f-number of 12. In addition, the lens 44 can have an aspherical surface 44a. These values are given since they are effective with a focusing lens of the type described in the lens and shutter package 30. Other optical values for different situations are contemplated.

It is desirable but by no means necessary to have movement of the lens carriers 40 and 42 tied to each other by for example a conventional pin/slot arrangement; whereby both lens carriers move in synchronism with each other, such that when the lens carrier 40 is in its operative position the second lens carrier 42 is in its inoperative position and vice versa. The present invention envisions that movement of the lens carriers can be achieved in response to manual effort, such as a handle (not shown) on the outside of the camera housing or through motor driven means. Moreover, while a dual focal length camera has been described, it will be appreciated that the present invention can provide for several focal lengths being selectively used.

It will be appreciated that when the focal lengths are changed as noted above, then for the particular camera involved corresponding changes should be made to such camera. For instance, it is desirable that a viewfinder mask (not shown) be automatically actuated to move into the viewfinder so that the field of view corresponds to the particular focal length which is operative. Although a viewfinder mask can be selectively used, it will be appreciated that the viewfinder can have optical markings which will delineate the field of view associated with each focal length selected or lenses may be moved or exchanged to alter the viewfinder magnification, or a single reflex lens arrangement might be used.

It will be further noted that a Fresnel (not shown) can be selectively placed over the strobe so as to appropriately narrow or widen the field depending on which focal length system is being used. Further in this regard, a switch member can be attached to either one or both of the respective lens carriers so that when they are moved into their respective operative positions, the microprocessor of the electronics system will compensate for the appropriate f-number of the lens system which is being used. Moreover, the present invention envisions the use of other lens groups. For instance, the arrangement of the negative lens and positive lens groups can be reversed. In other words, the negative lens can be on the outside and the positive lens group would be on the inside so as to provide a reverse telephoto or retrofocus lens system. Further, the telephoto lens group need not have the lens and shutter package arranged as illustrated but the telephoto lens group can be spaced in front of or disposed behind the package 30.

Figure 2:
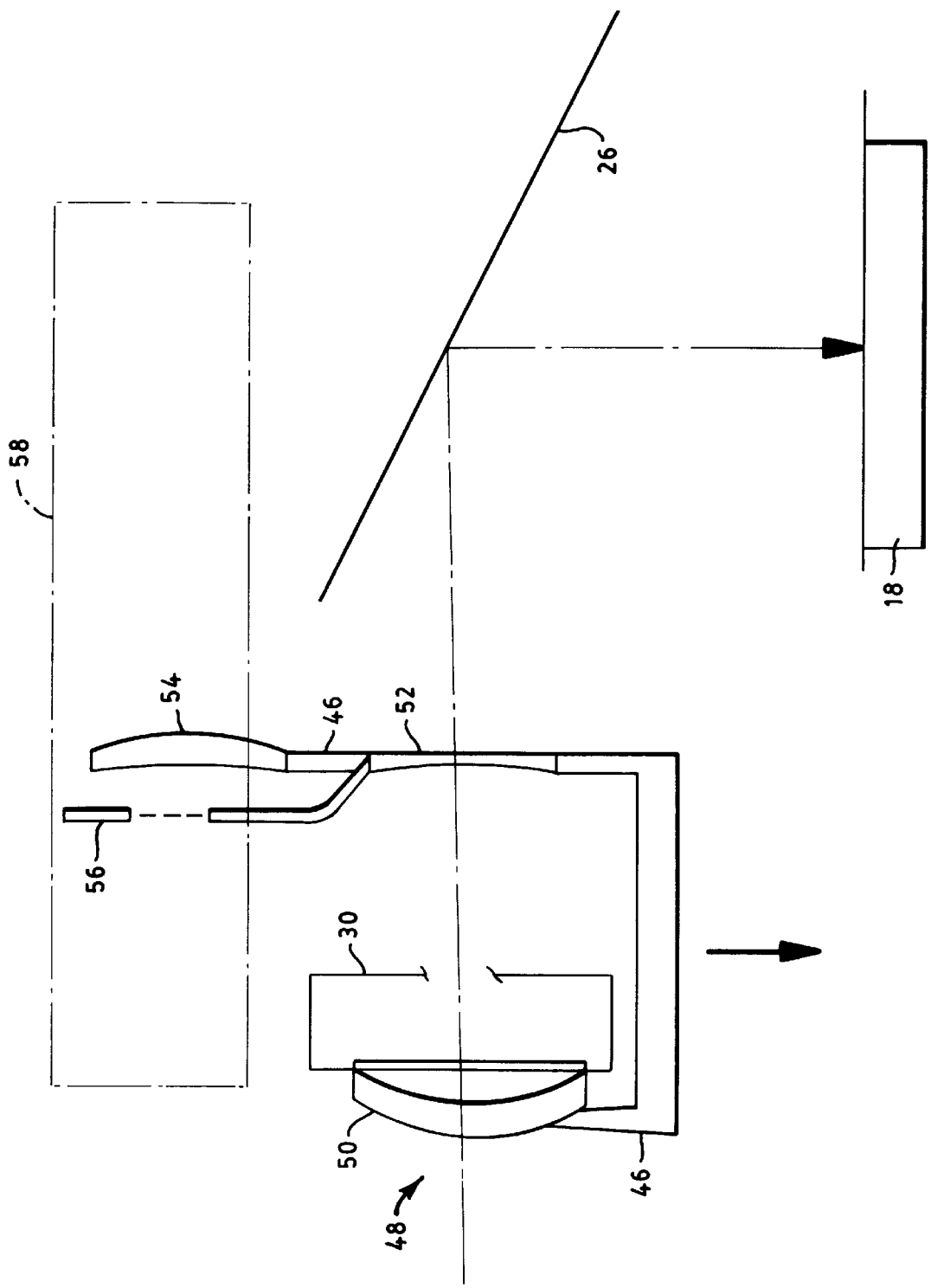
FIG. 2 is a schematic view of another preferred embodiment of the present invention.

Reference is made to FIG. 2 for illustrating another preferred embodiment of the present invention wherein a different lens carrier 46 is used in the same type of camera. In this regard, the lens carrier 46 which carries both sets or groups of the different focal length lens groups is adapted to translate vertically, as seen by the arrows, between two distinct positions within the camera housing. In this embodiment, there is provided a telephoto lens system 48 having the spaced positive and negative lens groups 50 and 52; respectively, and a lens 54 for providing a relatively shorter focal length than the other system. As depicted, the lens carrier 46 has the telephoto lens system 48 in its operative position with respect to the lens and shutter package 30. In addition, a viewfinder mask 56 which is also carried the carrier 46 is in an operative relationship with the viewfinder 58 so as to delineate the field of view of the particular lens system in operative relationship with the focusing lens of the lens and shutter package 30. It will be appreciated that the mask 56 is laterally offset from the lenses on the lens carrier since it will cooperate with the viewfinder. When it is desired to translate the lens system 48 to its inoperative position, the lens carrier is moved downwardly so as to present the lens 54 in its operative position (not shown). During such movement, the mask 56 moves out of operative relationship to the viewfinder 58. Movement of the lens carrier 46 can be effected in any suitable manner, such as manually or through a suitable drive system.

Figure 6:
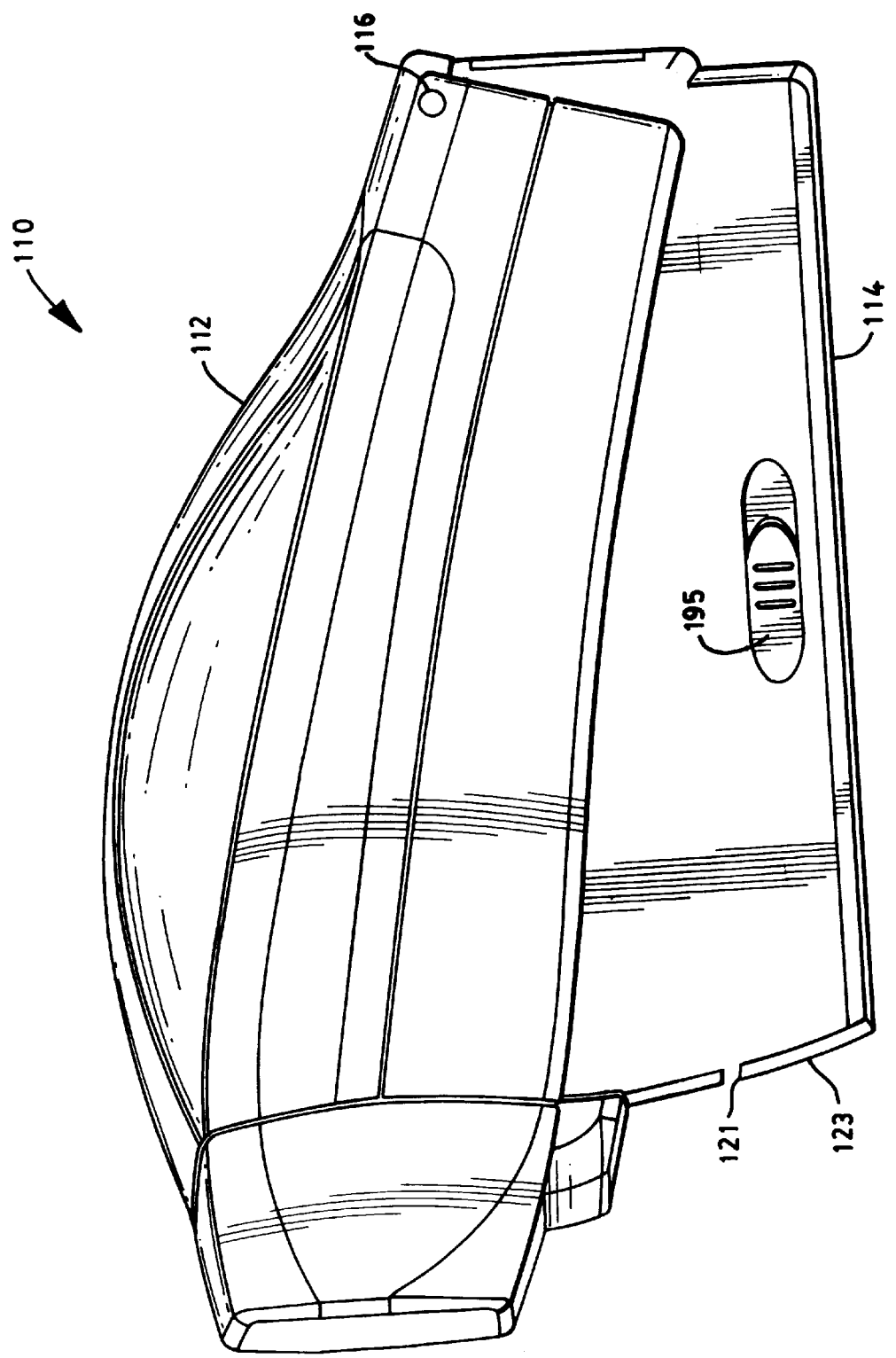
FIG. 6 is a left exterior view of the camera of FIG. 5 in an operative mode.
Figure 7:
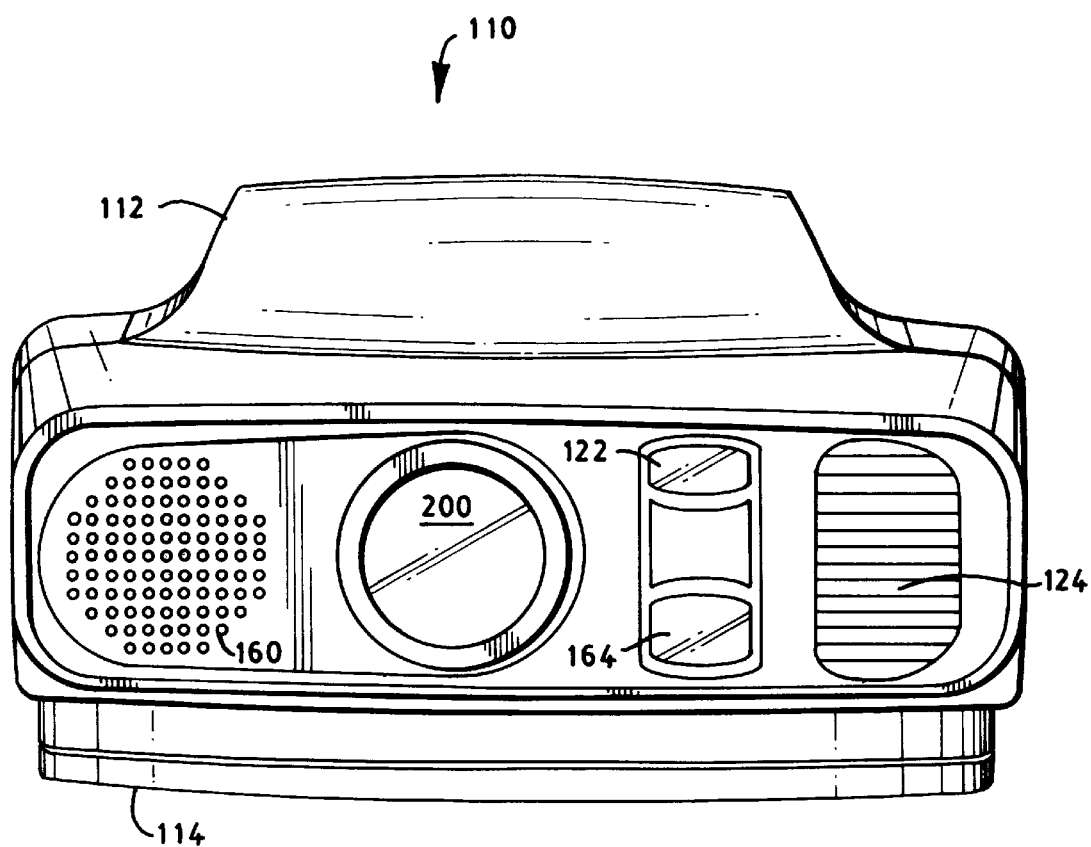
FIG. 7 is front exterior view of the camera of FIG. 5 in the inoperative mode.
Figure 8:
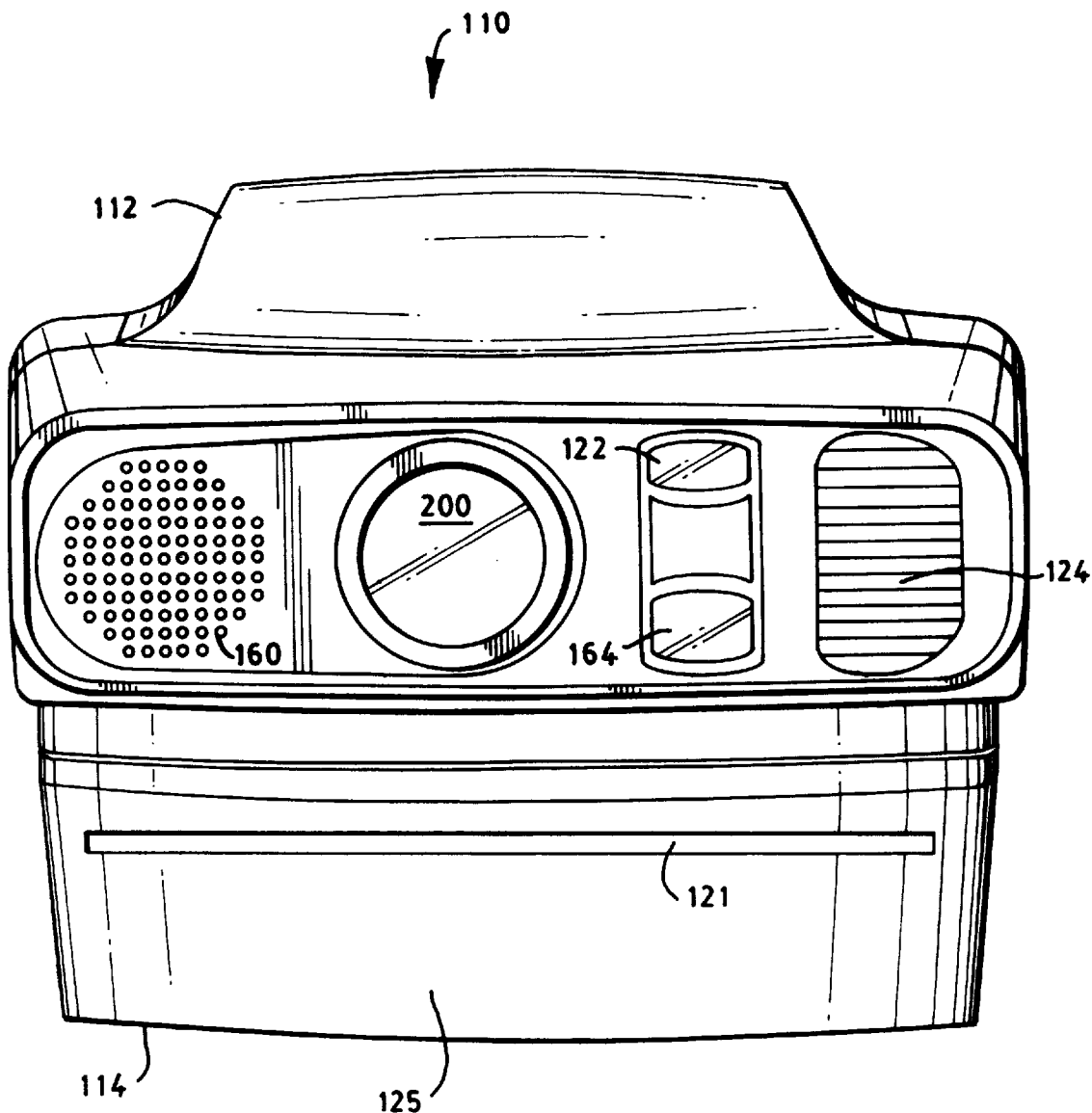
FIG. 8 is a front exterior view of the camera of FIG. 5 in the operative mode.

FIGS. 5–8 show another embodiment of an improved camera made according to the principles of the present invention. The camera 10 is preferably of the self-developing type and includes a first (upper) housing 112 and a second (lower) housing 114 which are operably joined together for movement relative to one another about a pivot 116. The housings are movable between a first (closed) position shown in FIG. 5, where the second housing 114 is at least partially received within the first housing 112, and a second (open) position shown in FIG. 6 where the second housing 114 is moved at least partially away from the first housing 112. Moving the first and second housings to the first position, as shown in FIGS. 5 and 7, places the camera in an inoperable mode whereby the camera is unable to take an image of a scene. Conversely, moving the first and second housings into the second position, as shown in FIGS. 6 and 8, places the camera 110 in an operable mode ready for taking an image of a scene.

The opening and closing of the folding camera 110 can be accomplished by methods and devices well known in the art. For instance, U.S. Pat. No. 4,508,440 issued Apr. 2, 1985 to Costa et al. discloses an erecting assembly, which description is herein incorporated by reference, for opening and closing a folding camera. The camera described in Costa uses a push button type of pad for activating the erection system, whereas the camera 110 can alternatively use a slide switch 195, shown in FIGS. 5 and 6, as the means for activating the erection system. Furthermore, if desired, the opening and closing of the camera could be operated by a motor (not shown).

FIG. 8 shows a slot 121 included in a front wall 125 of the second housing 114, where an exposed film unit can exit the camera 110. Note from FIG. 7 that in the first position the slot 121 is at least partially or perhaps fully disposed within the first housing 112 so that the exposed film unit cannot exit the camera 110 through the slot 121, whereas, in the second position the slot 121 (as shown in FIG. 8) is fully exposed below the first housing 112 so that the exposed film unit can exit the camera 110 through the slot 121.

The functional advantages of the above described features of the invention include camera compactness, security against mistakenly taking a picture when the housings are in the first position (i.e. the camera is in the inoperative mode), and further protection from unwanted leaking of light into the camera through the slot 121 when the camera is inoperative and the housings are in the first, closed position.

Figure 9A:
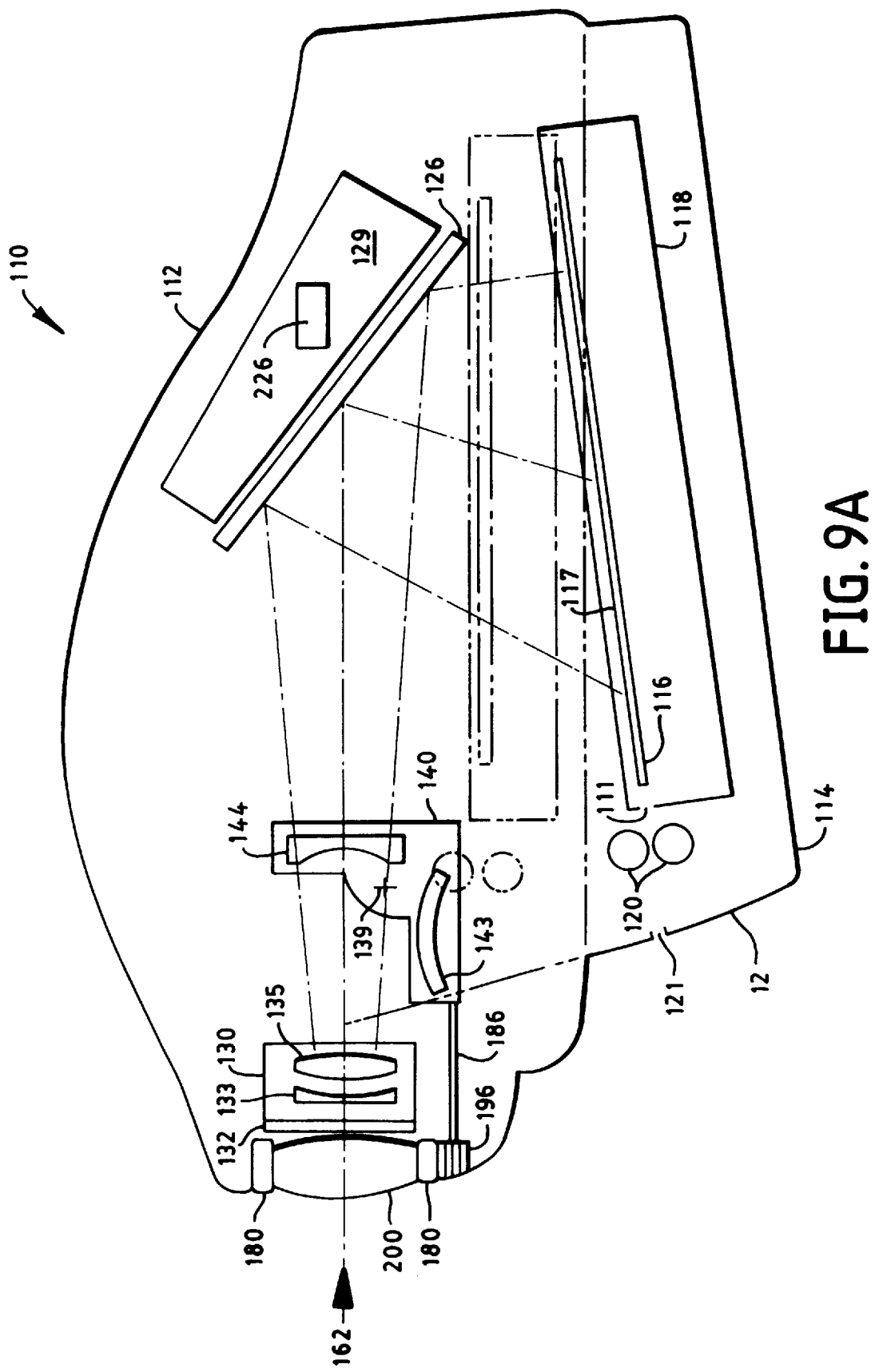
FIG. 9A is a schematical cross-sectional view of an embodiment of an optical system for the camera of FIG. 5 in a telephoto or long focal length mode.
Figure 9B:
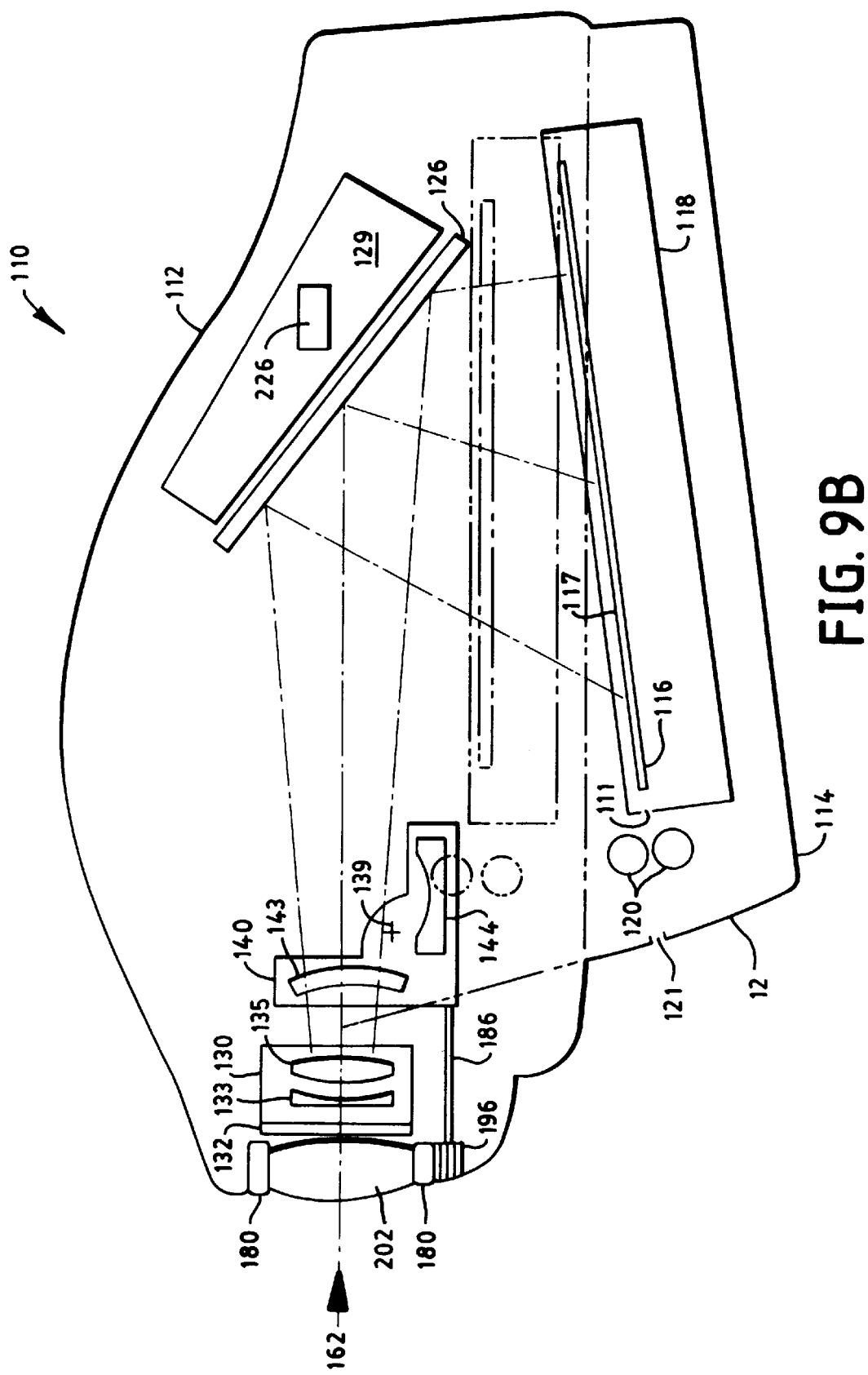
FIG. 9B is a schematical cross-sectional view of the embodiment of the optical system of FIG. 9A in a wide angle or short focal length mode.

Another preferred embodiment of an imaging device made according to the principles of the present invention is a folding multiple focal length self-developing type camera as shown in the left cross-sectional schematical views of FIGS. 9A and 9B. This particular embodiment extends the camera 110 of FIGS. 5–8 to multiple focal lengths. The first and second housings 112 and 114 together define a light-tight compartment for exposing and developing a self-developing type film unit 116 (i.e. an image recordable unit). A plurality of the film units 116 are stacked in a film cassette 118 and are sequentially exposed at a focal plane 117 and developed in a known manner as previously described.

The camera 110 provides a film processing system, schematically represented by a pair of spread rollers 120 that are situated in the second housing 114 near a cassette film exit slot 111 and a camera film exit slot 121. As is well known in this art, the spread rollers 120 when actuated serve to progressively spread a processing fluid located in a rupturable processing pod (not shown) in each film unit 116. Following an exposure of the topmost film unit 116 in the cassette 118, the film unit 116 is advanced through the cassette film exit slot 111 by a film advancing mechanism (not shown but forming a part of the camera 110) into a nip 123 of the pair of spread rollers 120. The spread rollers 120 rupture the pod and spread the processing fluid as they drive the film unit 116 from the camera film exit slot 121 formed in a front wall 125 of the second housing 114. The camera 110 includes an assembly 130 which, in turn, houses a shutter (not shown) and a focusing lens configuration such as the pair of quintic lens 133 and 135 shown and well known in the art. Basically, one quintic lens 135 is fixed and the other quintic lens 133 is movable throughout different focusing powers to properly focus the light from a scene in accordance with the selected focal length of the camera. The shutter is opened and closed to allow a predetermined amount of light 162 into the camera 110 to expose the film unit 116 along the focal plane 117. FIG. 9A illustrates the folding multiple focal length camera 110 with a telephoto lens having a selected long focal length positioned in the optical path 162 whereas, FIG. 9B illustrates the same camera 110 with a wide angle lens pair having a selected short focal length positioned in the optical path 162.

The camera 110 also includes a ranging system for determining the distance between the camera and the subject to be photographed. The preferred camera includes an ultrasonic transducer 160 as shown in FIG. 8. Since the ultrasonic ranging system is not a part of the present invention, it will not be described here in detail. An example of such a system is disclosed in U.S. Pat. No. 4,199,246 issued Apr. 22, 1980 to Muggli which is herein incorporated by reference in its entirety for background information. Basically, an ultrasonic transducer transmits a relatively short burst of ultrasonic frequencies and a synchronized receiver processes an echo signal produced by the transducer upon receipt of the echo after a predetermined time. This receiver produces a ranging signal having a characteristic related to the distance of the nearest subject being photographed. In response to the ranging signal, a lens element of a variable focus lens system is moved to the appropriate focal position corresponding to the subject range.

The camera 110 also includes a photometric device such as a photocell 122 for light measurement, a viewfinder system or optics 164 through which the scene to be photographed may be framed, and a strobe 124 for illuminating the scene to be photographed. A mirror 126 is used to redirect the image forming light rays 162 received from the scene. An electronics module or controller 129 is located behind the mirror 126 and serves to control the operations of the camera 110. Settings relating to the proper operation of the camera are stored in a digital memory such as a look-up table 226 located within the controller 129.

The lens and shutter assembly 130 of the camera 110 contains the shutter and the quintic focusing lenses 133 and 135 which together direct and focus the image forming light rays 162 onto the film unit 116 along the focal plane 117. Basically, in the assembly 130 the shutter blades (not shown) are located between quintic lenses 133 and 135. The shutter blades open and close under the guidance of the controller 129 to allow the proper, predetermined amount of light 162 to expose the film unit 116. The controller 129 obtains predetermined exposure control values from the look-up table 226 for controlling the shutter operation corresponding to the amount of light 162 needed to properly expose the film unit 116 whereby the amount of light 162 is measured by the photocell 122 and read by the controller 129. Focus of the light 162 onto the film unit 116 along the focal plane 117 is provided by the quintic lenses 133 and 135. The movable quintic lens 133 is movable throughout a number of zones or positions, either manually or automatically, to adjust the focus of the camera in cooperation with the fixed quintic lens 135. The range finding system determines the distance between the camera and the subject, then the controller 129 uses that information to set the quintic lenses into the appropriate zone again, retrieving predetermined information from the look-up table 226. The assembly 130 is embellished in FIG. 9A to include a transparent dust protector plate 132 covering the lens and shutter assembly 130 given the fact that there are provided mechanisms for providing multiple focal lengths in the camera 110.

Figure 9C:
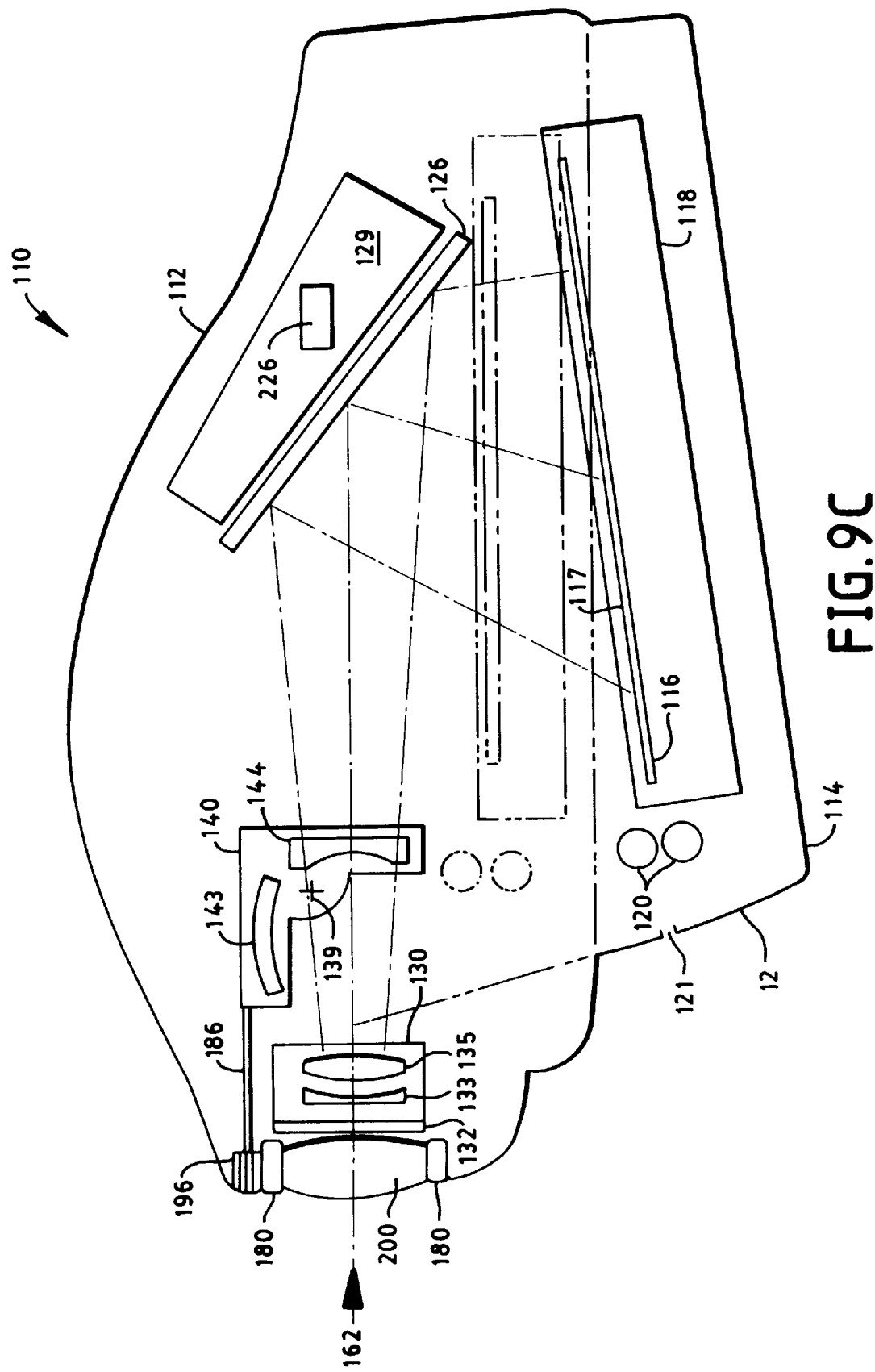
FIG. 9C is a schematical cross-sectional view of yet another embodiment of an optical system for the camera of FIG. 5 in a telephoto or long focal length mode.
Figure 9D:
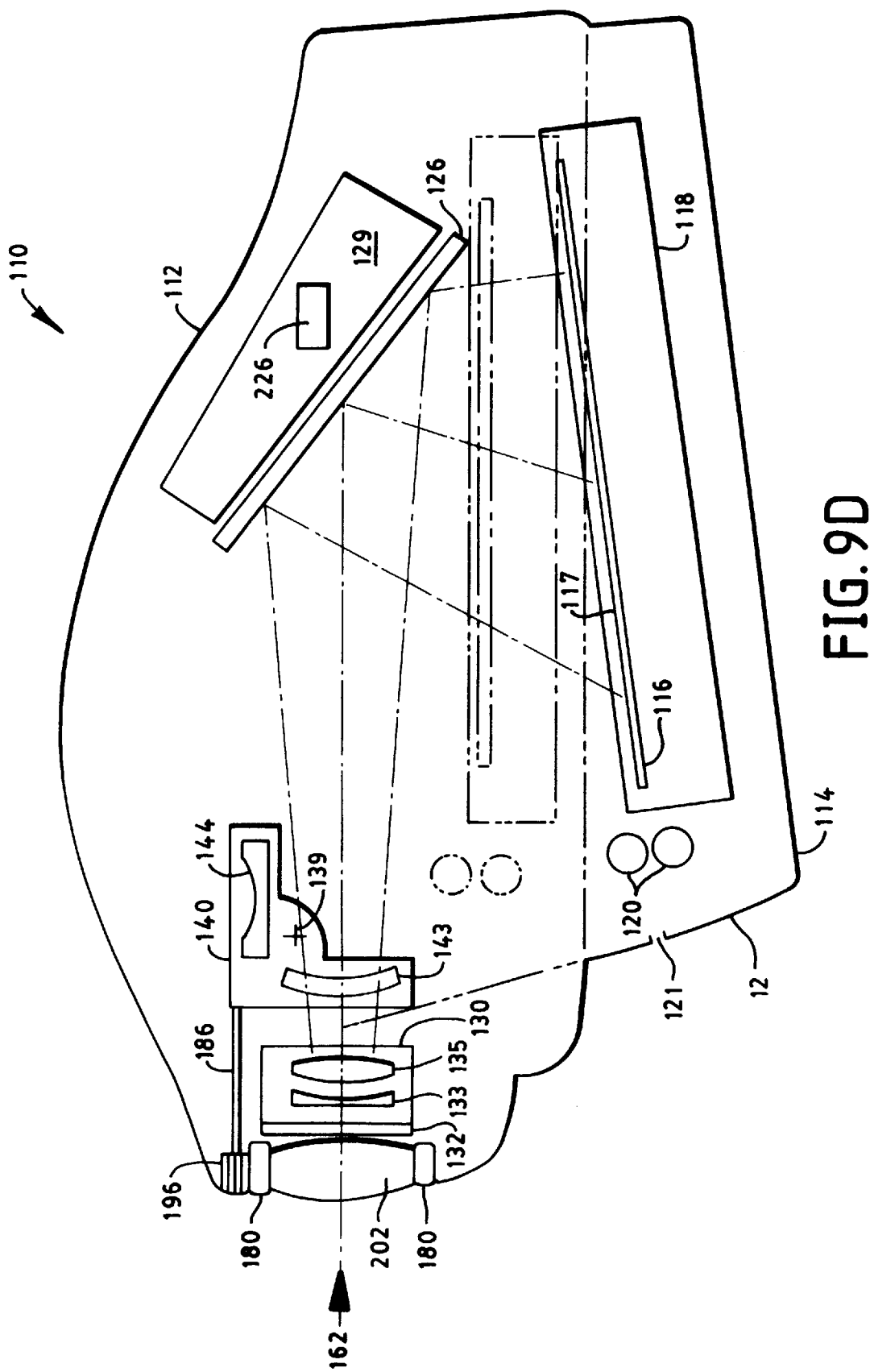
FIG. 9D is a schematical cross-sectional view of the embodiment of the optical system of FIG. 9C in a wide angle or short focal length mode.

Another embodiment of a folding multiple focal length camera made according to the principles of the present invention is shown in FIGS. 9C and 9D. The only difference from the embodiment illustrated in FIGS. 9A and 9B is the fact that the lens cradle or second housing 140 is installed so that the lens not in use on the second housing 140 is positioned above the optical path of the camera (rather than below the optical path of the camera of FIGS. 9A and 9B). This feature allows the camera 110 to be more easily and compactly folded. In each FIG. 9A–9D, the folding camera 110 is illustrated both in the erect or open position as designated by solid lines, and in the folded or closed position as designated by lines of dots and dashes.

Figure 10A:
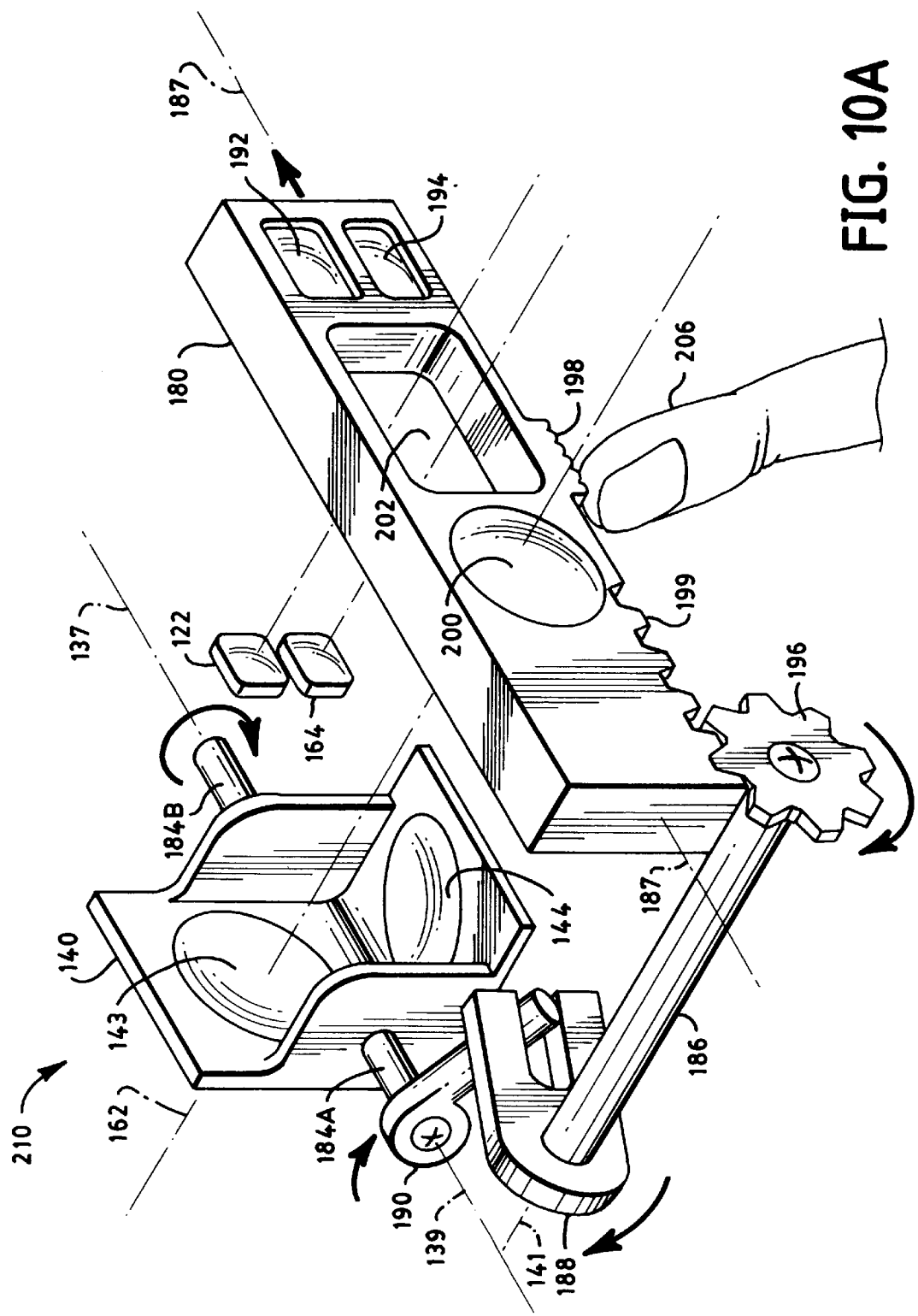
FIG. 10A is an operational drawing of a lens movement mechanism in the long focal length position, as shown in the multiple focal length camera of FIG. 9A, according to the principles of the invention.

FIGS. 10A and 10B illustrate a lens movement mechanism 210, made in accordance with the principles of the present invention, for use in the multiple focal length cameras of FIGS. 9A through 9D. The lens movement mechanism or lens positioning system 210 is provided to allow adjustment to the focus, viewfinder, and photometric optics when different focal lengths are selected. Specifically, FIG. 10A shows the mechanism or apparatus 210 in a telephoto (i.e. long focal length) position, whereas Figure 10B shows the apparatus 210 in a wide angle (i.e. short focal length) position. Other focal lengths could be used.

A first housing 180 moves left or right linearly along its longitudinal axis 187 which, in turn, causes the second housing or lens cradle 140 to rotate about an axis formed by the shafts 84A and 84B. The linear motion of the first housing is transferred by an integrally molded rack 199 to a gear or pinion 196 which is attached adjacent to one end of a gear shaft 186 and which rotates the shaft 186 about its longitudinal axis 141 which, in turn, rotates a fork arm 188 attached adjacent to the other end of the shaft 186. The rotation of the fork arm 188, in turn, causes rotation of the extending arm 190 connected therewith which then rotates the shafts 84A and 84B causing the second housing 140 to rotate as well. The shafts 84A and 84B are both fixedly attached to the second housing 140 and both rotate about the same longitudinal axis or second housing means axis 139. The linear movement of the first housing 180 can be initiated manually, for instance, by an user 206 moving a slide switch 198 into one of two positions whereby locking mechanisms (not shown) are used to lock the first and second housings 180 and 140, respectively, into the predetermined positions shown in FIGS. 10A and 10B. The long focal length or telephoto position of FIG. 10A (also FIGS. 9A and 9C) is established when a first focusing lens means or lens 200 lines up with a second focusing lens means or positive lens 143, and both a photometer 122 and viewfinder optics means or viewfinder optics 164 line up with means for passing light or opening 202. The short focal length or wide angle position of Figure 10B (also FIGS. 9B and 9D) is established when the negative wide angle lens, i.e. the second focusing lens means, 144 lines up with the opening 202, the photometer 122 lines up with photometric correction means or a correction photometer 192 and the viewfinder optics 164 lines up with the corrective viewfinder optics or viewfinder optics correction means 194.

Figure 11:
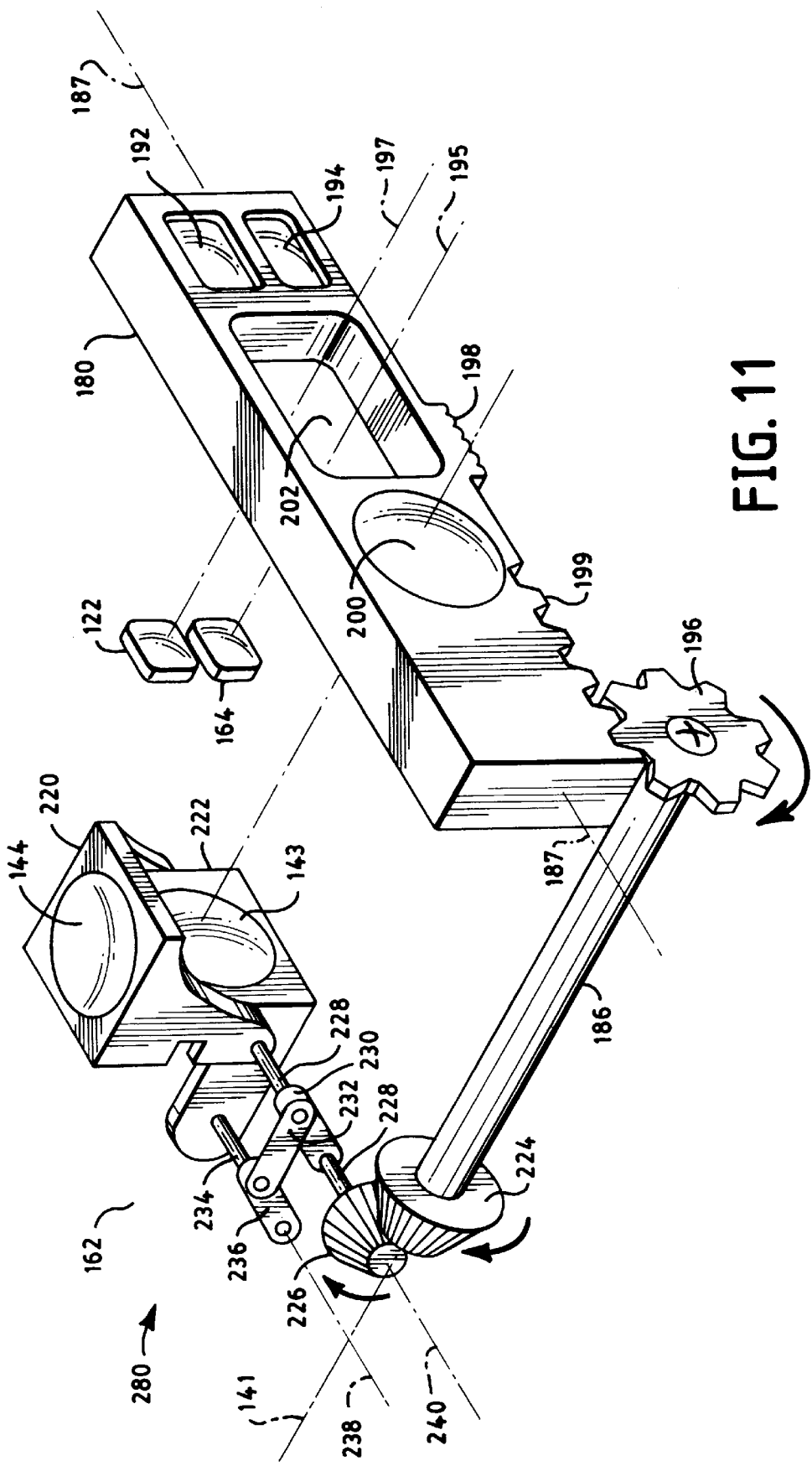
FIG. 11 is an operational drawing of a lens movement mechanism for a multiple focal length camera in the long focal length position according to the principles of the invention.
Figure 12:
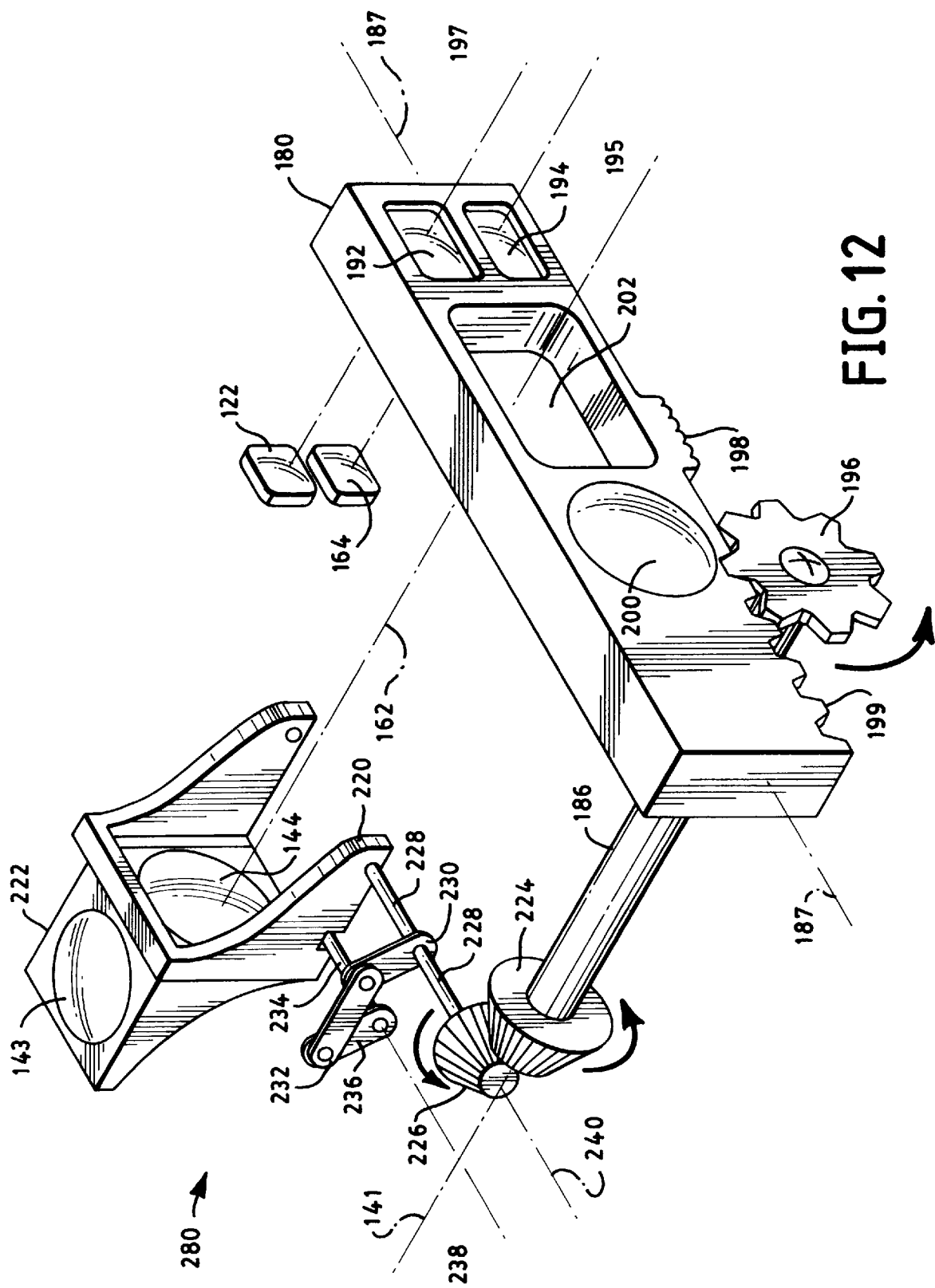
FIG. 12 is an operational drawing of the lens movement mechanism of FIG. 11 for a multiple focal length camera in the short focal length position according to the principles of the invention.

FIGS. 11 and 12 illustrate a second lens movement mechanism 280, made in accordance with the principles of the present invention, which could be used in place of the lens movement mechanisms shown in the multiple focal length cameras of FIGS. 9A through 9D. The lens movement mechanism or lens positioning system 280 is provided to allow adjustment to the focus, viewfinder, and photometric optics when different focal lengths are selected. Specifically, FIG. 11 shows the mechanism or apparatus 280 in a telephoto (i.e. long focal length) position, whereas FIG. 12 shows the apparatus 280 in a wide angle (i.e. short focal length) position. Other focal lengths could be used.

A first housing 180 moves left or right linearly along its longitudinal axis 187 which, in turn, causes the shafts 228, 234 to rotate the second housing, i.e. lens cradles 220, 222, about axes 240, 238 respectively. The linear motion of the first housing is transferred by an integrally molded rack 199 to a gear or pinion 196 which is attached adjacent to one end of a gear shaft 186 and which rotates the shaft 186 about its longitudinal axis 141 which, in turn, rotates beveled gears 224 and 226. The gear 226 is attached to and rotates a first lens shaft 228 which, in turn, rotates a first lens carrier or first lens holder 220 along axis 240. The rotary motion of the first lens shaft 228 is also applied to a second lens shaft 234 through pivotally connected links, i.e. linkage, 230, 232 and 236, causing a second lens holder 222 to rotate about axis 238. Link 230 is fixedly attached to the first lens shaft 228 so that any rotation of the first lens shaft 228 will cause an equal angular rotation of link 228 about axis 240. Similarly, link 236 is fixedly attached to the second lens shaft 234 so that any rotation of link 236 will cause an equal angular rotation of the second shaft 234. In other words, the linkage 230, 232 and 236 facilitates the transfer of rotational movement of the first lens shaft 228 to rotational movement of the second lens shaft 234.

The linear movement of the first housing 180 can be initiated manually, for instance, by an user moving a slide switch 198 into one of two positions whereby locking mechanisms (not shown) are used to lock the first and second housings 180 and 222, 220, respectively, into the predetermined positions shown in FIGS. 11 and 12.

The long focal length or telephoto position of FIG. 11 is established when a first focusing lens means or lens 200 and a second focusing lens means or positive lens 143 are both positioned along the imaging optical path 162 of the camera. The means for passing light or opening 202 lines up with both the photometer optical path 197 of the photometer 122 and the viewfinder optical path 195 of the viewfinder optics 164.

The short focal length or wide angle position of FIG. 12 is established when the second focusing lens means, i.e. the negative wide angle lens, 144 is positioned along the imaging optical path 162 through the opening 202. The photometric correction means or a correction photometer 192 and the photometer 122 are both positioned along the photometer optical path 197. The viewfinder optics 164 and the corrective viewfinder optics or viewfinder optics correction means 194 are both positioned along the viewfinder optical path 195.

Figure 13A:
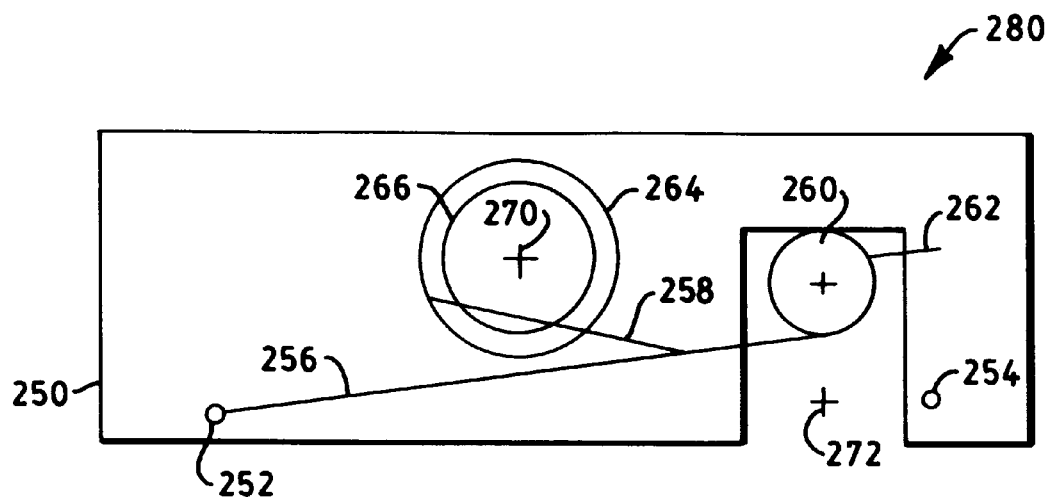
FIGS. 13A and 13B are diagrams showing a front view of a mechanism for moving a first lens in and out of the optical path of a multiple focal length camera while concurrently moving a second lens in and out of the optical path of the viewfinder according to the principles of the invention.
Figure 13B:
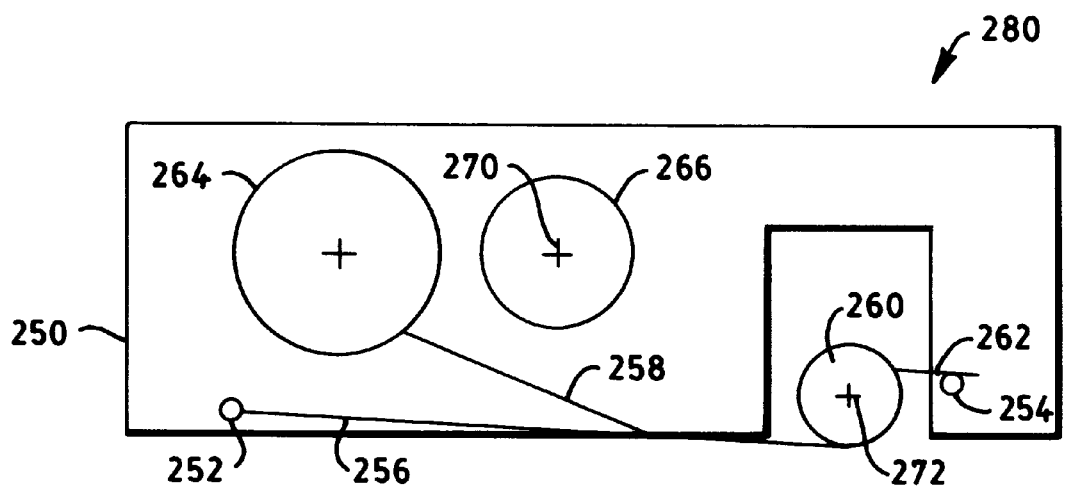

FIGS. 13A and 13B are diagrams showing a front view of a mechanism 280 for moving a first lens 264 in and out of the imaging optical path 270 of a multiple focal length camera (not shown) while concurrently moving a second lens 260 in and out of the optical path 272 of the viewfinder (not shown). FIG. 13A illustrates the long focal length position where the first lens 264 is positioned along the imaging optical path 270 and the second lens 260 is positioned outside the viewfinder optical path 272. FIG. 13B illustrates the short focal length position where the first lens 264 is positioned outside the imaging optical path 270 and the second lens 260 is positioned along the viewfinder optical path 272.

The mechanism 280 includes a body 250 having a pivot point 252, a stop 254, an opening 266, and a slot for allowing the second lens 260 to move between first and second positions. The movement of the first lens 264 perpendicular to the optical camera axis 270 can be facilitated by any known means, such as the rack and pinion mechanism previously described and illustrated in FIGS. 11 and 12. A leaf spring 258 is fixedly connected at one end to the first lens 264 and at the other end to a first arm 256. The first arm 256 is pivotally connected at one end to the body 250 at pivot point 252 and fixedly connected at the other end to the second lens 260. The second lens 260 includes a second arm 262 fixedly attached thereto. When the first lens 264 is positioned along the camera optical path 270 through opening 266 in FIG. 13A, the leaf spring 258 and first arm 256 hold the second lens 260 in the position shown outside of the viewfinder optical path 272. When the first lens 264 is moved to the position shown in FIG. 13B, the leaf spring 258 and the first arm 256 move and hold the second lens 260 into alignment with the viewfinder optical path 272. The accuracy of stopping the second lens 260 in the correct position along the viewfinder optical path 272 is assured by the second arm 262 coming into contact with stop 254.

The principles of the present invention can be applied to a variety of imaging devices such as, but not limited to the self-developing type of cameras described above. Furthermore, the present invention envisions that the first and second housings could be a camera back attachable suitably to a photographic apparatus.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

We claim:

1. A camera comprising:
   a first and a second housing being operably joined together for movement relative to each other such that said second housing is movable relative to said first housing between at least a first position and a second position, said first housing being formed to at least partially receive therein said second housing such that when said second housing is in said first position said second housing is at least partially received within said first housing;
   a film plane disposed in said second housing; and
   a focusing lens means, disposed in said first housing, for directing image forming light rays from a scene to the film plane disposed in said second housing at said second position; said focusing lens means comprising: at least a dual focal length lens arrangement having first and second lens systems; respectively, each of the lens systems being movable into and out of operative optical relationship with the focusing lens means for providing corresponding different focal lengths for the camera.

2. The camera of claim 1 wherein one of the lens systems is a telephoto type.

3. The camera of claim 2 wherein said camera is of the self-developing type.

4. The camera of claim 1 further comprising means for mounting each of the lens systems for sequential movement into and out of operative optical relationship with the focusing lens means, such that only one of the lens systems is in operative relationship at any one time.

5. The camera of claim 4 wherein said means for mounting each of the lens systems includes a single carrier means which is movable between first and second positions, such that one of the lens systems is in operative optical relationship with the focusing lens means when said carrier is in the first position and the other of the lens systems is in operative optical relationship with the focusing lens means when said carrier is in the second position.

6. The camera of claim 4 wherein said mounting means includes a separate carrier means for each of the lens systems, wherein each of the separate carriers is coupled to each other so as to be mutually movable with respect to each other, whereby only one of the respective lens systems is in operative optical relationship with the focusing lens means when the other lens system is out of operative optical relationship.

7. The camera of claim 1 wherein means are provided for changing camera functions in response to which of the lens systems is in operative relationship with the focusing lens system.

8. Apparatus for use with an imaging device, said apparatus comprising: first and second housing means being operably joined together for movement relative to each other such that said second housing means is movable relative to said first housing means between at least a first position and a second position, said first housing means being formed to at least partially receive therein said second housing means and being connectable to the imaging device, such that when said second housing means is in said first position said second housing means is at least partially received within said first housing means; said second housing means including an exiting means for allowing exiting of at least one image recordable film unit therefrom when in said second position, and when said second housing means is in said first position said exiting means is at least partially disposed within said first housing means to prevent said at least one image recordable film unit from exiting.

9. The apparatus of claim 8, wherein said second housing means houses a film cassette containing a plurality of self-developing said film units, each of which is sequentially exitable from said exiting means.

10. The apparatus of claim 9, wherein said first housing means houses imaging means including means for exposing one of said film units.

11. The apparatus of claim 8, wherein said imaging device is in an operable mode when said second housing means is in said first position and said imaging device is in an inoperable mode when said second housing means is in said second position.

12. The apparatus of claim 8, wherein said first and second housing means house a multiple focal length imaging system.

13. A multi-focal length camera of the self-developing type comprising: first and second housing means being operably joined together for movement relative to each other such that said second housing means is movable relative to said first housing means between at least a first position and a second position, said first housing means being formed to at least partially receive therein said second housing means, such that when said second housing means is in said first position said second housing means is at least partially received within said first housing means; said second housing means including an exiting means for allowing exiting of a film unit therefrom when in said second position, and when said second housing means is in said first position said exiting means is at least partially disposed within said first housing means preventing said film unit from exiting.

14. The camera of claim 13, wherein said second housing means houses a film cassette containing a plurality of self-developing said film units.

15. The camera of claim 14, wherein said first housing means houses imaging means for sequentially exposing each one of said film units.

16. The camera of claim 14, wherein whenever said camera is in an imaging mode, said second housing means is in said first position and whenever said camera is in a non-imaging mode said second housing means is in said second position.

17. A lens positioning method for use in an imaging device, said imaging device including a first housing means having at least one first focusing means and a second housing means having at least one second focusing means, said method comprising the steps of:

moving a first of said at least one first focusing means into an optical path of said imaging device when said first housing means is moved to a first position;

moving a second of said at least one first focusing means into said optical path when said first housing means is moved to a second position different from said first position; and transferring motion of said first housing means into motion of said second housing means for moving a first of said at least one second focusing means into said optical path upon moving said first housing means to said first position and moving a second of said at least one second focusing means into said optical path upon moving said first housing means to said second position.

18. A lens positioning system for use in an imaging device having optical means for directing light along an imaging optical path from a scene onto a film plane, photometric means, viewfinder optics means and means for operating with multiple focal lengths, said lens positioning system comprising:

first housing means for housing first focusing lens means, means for passing light, photometric correction means and viewfinder optics correction means;

second housing means for housing second focusing lens means, said second focusing lens means comprising first focal length focusing lens means and second focal length focusing lens means; and motion transfer means for transferring motion of said first housing means into motion of said second housing means so that, in a first focal length position, said first focal length focusing lens means and said means for passing light are both positioned along the imaging optical path, said photometric correction means and said photometric means are both positioned along a photometer path and said viewfinder optics correction means and said viewfinder optics means are both positioned along a viewfinder optical path, and in a second focal length position, said second focal length focusing lens means and said first focusing lens means are both positioned along said the imaging optical path and both said photometric means and said viewfinder optics means are positioned in line with said means for passing light.

19. The lens positioning system of claim 18, wherein both said photometric means and said photometric correction means are light photometers.

20. The lens positioning system of claim 18, wherein said motion transfer means comprises:

a rack and pinion operably connected to said first housing means;

a gear shaft having said pinion connected thereto adjacent to one end of said gear shaft and having a fork arm connected thereto adjacent to another end of said gear shaft, said fork arm being perpendicular to a longitudinal axis of said gear shaft;

a lens shaft connected to said second housing means; and an extending arm connected adjacent to one end of said lens shaft, said extending arm attached to said fork arm and perpendicular to a longitudinal axis of said lens shaft.

21. The lens positioning system of claim 18, wherein said second housing means comprises a first lens carrier for housing said first focal length focusing lens means, and a second lens carrier for housing said second focal length focusing lens means.

22. The lens positioning system of claim 21, wherein said motion transfer means comprises:

a rack and pinion operably connected to said first housing means;

a gear shaft having said pinion connected thereto adjacent to one end of said gear shaft and having a first beveled gear at the other end of said gear shaft;

a first lens shaft positioned perpendicular to said gear shaft and connected at one end to said second housing means and having a second beveled gear interactive with said first beveled gear at the other end of said first lens shaft.

23. The lens positioning system of claim 21, wherein said motion transfer means further comprises a linkage for transferring rotational movement of said first lens shaft to rotational movement of a second lens shaft connected to said second lens carrier.

24. The lens positioning system of claim 18, wherein said motion transfer means further comprises:

a first arm pivotally attached at one end to a pivot point on a body and fixedly attached at another end to said viewfinder optics correction means having a second arm protruding therefrom;

a leaf spring connected at one end to said first focal length focusing lens means and at another end to said first arm; and a stop for aligning said viewfinder optics correction means along the viewfinder optical path when engaged with said second arm.

25. A lens positioning system for providing multiple focal lengths in an imaging device having means for directing image forming light rays from a scene to an imaging plane, said lens positioning system comprising:

first housing means for housing a first focusing lens means;

second housing means for housing a second focusing lens means; and means for transferring motion of said first housing means into motion of said second housing means, said first and second housing means being movable to position said first and second focusing means along an optical path of said image directing means to provide at least one of said multiple focal lengths.

26. The lens positioning system of claim 25, wherein said first and second housing means are movable by said means for transferring motion to position said first and second focusing means along said optical path of said image directing means to provide another of said multiple focal lengths.

27. The lens positioning system of claim 25, wherein said at least one multiple focal length provides a telephoto type lens system.

28. The lens positioning system of claim 25, wherein said at least one multiple focal length provides a wide angle type lens system.

* * * * *